United States Patent Office 3,512,931
Patented May 19, 1970

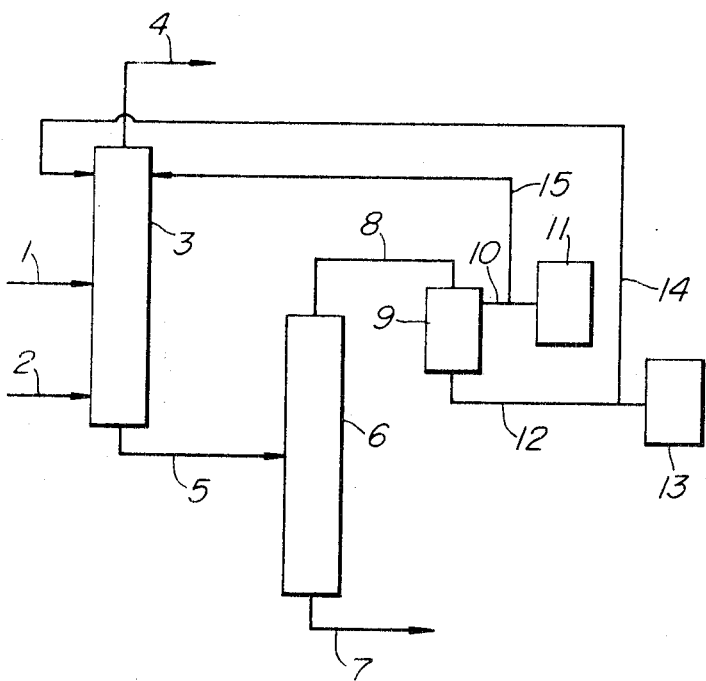

3,512,931
PROCESS FOR RECOVERING HYDROGEN FLUORIDE AND BORON FLUORIDE
Tamotsu Ueno and Takashi Nakano, Niigata-shi, Japan, assignors to Japan Gas-Chemical Company, Inc., Tokyo, Japan, a corporation of Japan
Filed Aug. 2, 1967, Ser. No. 657,939
Claims priority, application Japan, Aug. 12, 1966, 41/53,012
Int. Cl. C01b 7/22, 9/08
U.S. Cl. 23—153                         2 Claims

ABSTRACT OF THE DISCLOSURE

A process for recovering hydrogen fluoride and boron fluoride from a xylene-hydrogen fluoride-boron fluoride complex by the thermal decomposition thereof, which is carried out in a modified fractionator in the presence of one or more of the decomposing mediums selected from the group consisting of hydrocarbons from $C_3$ to $C_7$ and $CCl_4$ under a pressure between 1 and 8 atm. at a temperature between 40 and 200° C., in order to prevent disproportionation reactions and/or isomerization reactions of xylenes and to circulate the recovered hydrogen fluoride and boron flouride directly to an extraction step without using a compressor.

---

The present invention relates to a process for recovering and circulating hydrogen fluoride and boron fluoride from a xylene-hydrogen fluoride-boron fluoride complex obtained by extracting m-xylene and/or other xylene isomers from a xylene mixture with hydrogen fluoride and boron fluoride as solvent.

All xylene isomers contained in a xylene mixtue, wherein ethyl benzene, o-xylene, m-xylene, p-xylene and the likes are contained, are close to one another in their boiling points. Especially, m-xylene and p-xylene are extremely close to each other in their boiling points (the difference between the boiling points is 0.75° C.). It is extremely difficult, therefore, to separate by distillation each xylene isomer of a high purity, especially m-xylene and p-xylene of high purities, from the xylene mixture.

On account of these problems, the inventors investigated a method for separating by extracting m-xylene and/or other xylene isomers from the xylene mixture by employing hydrogen fluoride and boron fluoride as solvent and succeeded in separating each xylene isomer of a high purity. In order to extract xylene isomers from the xylene mixture with hydrogen fluoride and boron fluoride, a raw material, the xylene mixture, is supplied to a central portion of a xylene extractor. Liquid hydrogen fluoride and boron fluoride are supplied to the top of a tower, and reflux xylene isomers and a diluent (a saturated hydrocarbon to be added to improve selectivity, for example, n-hexane) are supplied to the bottom of the tower. Thus a counter-current extraction is continuously conducted in the temperature range of −20°−+30° C. The xylene isomers in the raw xylene mixture are extracted in the form of a hydrogen fluoride solution of xylene-hydrogen fluoride-boron fluoride complex. An extract is removed out from the bottom of the tower and a raffinate is removed out from the top of the tower. The extract is delivered into a decomposer and heated, whereby the complex is decomposed. In this way, the xylene isomers can be separated by removing hydrogen fluoride and boron fluoride.

It has been known that in the presence of hydrogen fluoride and boron fluoride, xylenes, especially o-xylene and ethylbenzene, form benzene, $C_{10}$-aromatic hydrocarbons and the like owing to a disproportionation reaction, but they bring about the formations of various isomers owing to an isomerization reaction as well. This inclination is remarkable when the temperature is high and the pressure is high. Therefore, the decomposition of complex, wherein the xylene-hydrogen fluoride-boron fluoride complex is thermally decomposed to produce xylene, hydrogen fluoride and boron fluoride, is generally conducted under an atmospheric pressure or a reduced pressure.

In order to restrain the isomerization and the disproportionation reaction of xylenes, there has been developed a method wherein while a vapor of a hydrocarbon having a lower boiling point than those of xylenes is thoroughly contacted with the complex of xylene-hydrogen fluoride-boron fluoride being in a ratio of 1:5–20:0.3–2.0 by mol, the complex is thermally decomposed. (See for example, Japanese Pat. No. 487,176, published Apr. 13, 1966, as Japanese patent specification No. 6577/66, assigned to the assignee of this invention.)

In these prior arts, hydrogen fluoride and boron fluoride are delivered to an extractor by employing devices such as compressor or the like and used circulatively. But both hydrogen fluoride and boron fluoride are extremely corrosive materials. When such rotary machines are employed, it is necessary to use an expensive material for structure. Moreover, there are difficulties in preventing a leakage at a sliding point, i.e. stuffing box, and the like. It is obliged to employ materials chosen from limited sort of materials. Furthermore, an expense for driving a compressor is not small.

Conducting the decomposition of the xylene-hydrogen fluoride-boron fluoride complex under high pressure in the state of an elevated decomposition temperature purposely has been scarcely considered from the viewpoints of a disproportionation reaction and an isomerization reaction of xylenes as described above. On the conntrary, the inventors investigated eagerly about such a decomposition reaction as being carried out under a high pressure. As the result, it has been found that when the decomposition of the xylene complex is conducted by contacting the said complex with the vapor of hydrocarbon employed as a decomposing medium, even if a decomposing pressure is raised up to about 6–8 atm., a side reaction is negligible and yields of hydrogen fluoride and boron fluoride are extremely high. The present invention is based on this discovery.

According to the present invention there is provided a process for recovering hydrogen fluoride and boron fluoride, wherein hydrogen fluoride and boron fluoride are used for solvent and m-xylene and/or other xylene isomers are extracted from a xylene mixture containing m-xylene and/or other xylene isomers and the produced xylene-hydrogen fluoride-boron fluoride complex is decomposed, characterized by evaporating and refluxing inert substances, such as saturated hydrocarbon or saturated halogen-containing compound, which are lower than xylenes in boiling point, for a decomposing medium in a decomposer, whereby a pressure inside the decomposer is maintained in the state of an elevated pressure, and circulating the recovered hydrogen fluoride and boron fluoride directly into a xylene-extractor without compressing them by means of a compressor or the like.

As decomposing medium to be employed at this time, inert substances having lower boiling points than those of xylenes, for example, carbon tetrachloride and saturated hydrocarbons from $C_3$ to $C_7$ are preferable. The decomposing pressure must be higher than the operating pressure of the xylene extractor. On the other hand, the maximum decomposing pressure is decided depending on the boiling point of a hydrocarbon to be employed. When a substance having a relatively high boiling point (about $C_6$) is employed, the preferable pressure is up to 6 atmospheres and when employing a substance having a low boiling point (about $C_4$), it is up to 8 atmospheres. The contacting time is preferably not larger than 15 seconds.

Although any sort of apparatuses can be employed if the evaporation can be rapidly conducted therein, to put the present invention into operation, it is preferable to employ fractionator such as modified fractionator as described below.

In the modified fractionator, if the complex solution is directly poured into an ascending vapor of the aforesaid decomposing medium, which is refluxing in the decomposer, the complex can be perfectly decomposed at a decomposition temperature of 40–200° C. in a contact time of not longer than 15 seconds. The vapor of inert substances, the decomposing medium, is interposed between the mixed vapor of hydrogen fluoride-boron fluoride flowing up to the top of the column after the decomposition and the xylenes falling down to the bottom of the column in the state of liquid, so that the xylenes do not contact with the hydrogen fluoride-boron fluoride after the decomposition. Therefore, xylenes to be recovered from the bottom of the column contain only hydrogen fluoride and boron fluoride in an amount of 0.01% by weight of each. Loss and coloring of the xylene owing to the reaction are extremely small. Therefore, they are supplied to a general hydrocarbon refining process after a simple washing with water was conducted. The top of decomposer is cooled at a temperature between −20–+20° C., and a small amount of decomposing medium accompanied with the hydrogen fluoride-boron fluoride is condensed and separated therefrom and refluxed to the decomposer.

The drawing shows a process diagram representing an operating mode of the method of the present invention.

The present invention will be explained further with reference to the drawing. In the drawing, the raw material, the xylene mixture, is supplied to a xylene extractor 3 through a tube 1. The reflux xylene and/or the diluent are supplied through a tube 2. Xylene isomers, which are extracted with the hydrogen fluoride-boron fluoride for solvents supplied to the top of the extractor, are taken out through a tube 5. The raffinate in the extraction is taken out through a tube 4. The xylene-hydrogen fluoride-boron fluoride complex taken out through the tube 5 is supplied to a decomposer 6 by means of a pump and is decomposed under a pressure of 1–8 atm. at a temperature of 40–200° C. In the interior of the decomposer, the aforesaid inert substances are evaporated and refluxed and the extracted xylene separated owing to the decomposition is taken out through a tube 7, while hydrogen fluoride and boron fluoride for extracting agents are taken out through a tube 8. The hydrogen fluoride and the boron fluoride enter into a separator 9 and most of the hydrogen fluoride is condensed to be drawn out through a tube 12, while the boron fluoride gas containing a little amount of hydrogen fluoride vapour is drawn out through a tube 10. The decomposer is operated under an elevated pressure as described above and in the state of a higher pressure than that of the extractor. Therefore, both the hydrogen fluoride and the boron fluoride can be employed circulatively through tubes 14 and 15 without being elevated in their pressures. In order to stabilize the operation, accumulators having suitable capacities are preferably provided in the sides of the tubes 10 and 12 respectively.

As above-mentioned, according to the present invention, the decomposer is operated under an elevated pressure and, therefore, apparatuses for circulatively employing the solvent are not required at all. According to the present invention, a cost of the extracting process can be remarkably reduced and effects are extremely remarkable.

In the next place, examples will be described, but these are only illustrative and do not limit modes of the present invention in any meanings.

EXAMPLE 1

A m-xylene complex obtained by extracting with an extracting agent, wherein the ratio of hydrogen fluoride to boron fluoride was 10 to 1 by mol, was decomposed in a modified fractionator with changing a pressure from 2 to 10 atmospheres, while hexane was entirely refluxed and the results shown in Table 1 were obtained. Until the pressure became up to about 6 atm., a side reaction was almost negligible.

TABLE 1

| Decomposition pressure, atmospheres | 2 | 4 | 6 | 8 | 10 |
|---|---|---|---|---|---|
| Temperature of the column bottom, °C | 131 | 165 | 172 | 185 | 217 |
| Yield of recovered xylene (based on the supplied xylene, percent by weight) | 99.9 | 99.8 | 99.5 | 99.0 | 98.2 |

| | Composition of supplied xylene, percent by weight | Composition of recovered xylene, percent by weight | | | | |
|---|---|---|---|---|---|---|
| Benzene | 0 | 0 | 0 | 0.05 | 0.30 | 0.80 |
| Toluene | 0 | 0 | 0.01 | 0.07 | 0.40 | 0.90 |
| Ethylbenzene | 0.01 | 0 | 0 | 0 | 0 | 0 |
| p-Xylene | 0.20 | 0.20 | 0.3 | 0.4 | 0.8 | 2.1 |
| m-Xylene | 99.0 | 99.0 | 98.8 | 98.3 | 96.0 | 92.7 |
| o-Xylene | 0.79 | 0.8 | 0.8 | 1.0 | 1.2 | 2.0 |
| Residues having high boiling point | 0 | 0 | 0.09 | 0.18 | 1.3 | 1.5 |

EXAMPLE 2

An experiment in respect to the decomposition of a mixed complex containing m-xylene, o-xylene and p-xylene was conducted in the similar way to that in Example 1 and the results shown in Table 2 were obtained.

TABLE 2

| Decomposition pressure, atmospheres | 2 | 4 | 6 | 8 | 10 |
|---|---|---|---|---|---|
| Temperature of the column bottom, °C | 133 | 161 | 174 | 188 | 213 |
| Yield of recovered xylene (based on the supplied xylene, percent by weight) | 99.9 | 99.3 | 98.9 | 97.2 | 95.4 |

| | Composition of supplied xylene, percent by weight | Composition of recovered xylene, percent by weight | | | | |
|---|---|---|---|---|---|---|
| Benzene | 0 | 0 | 0 | 0.01 | 0.13 | 0.18 |
| Toluene | 0 | 0.05 | 0.08 | 0.18 | 0.20 | 0.25 |
| Ethylbenzene | 0.01 | 0 | 0 | 0 | 0 | 0 |
| p-Xylene | 23.0 | 23.1 | 23.0 | 22.2 | 21.3 | 20.2 |
| m-Xylene | 52.1 | 52.3 | 54.0 | 53.1 | 55.2 | 55.9 |
| o-Xylene | 24.9 | 24.4 | 22.7 | 22.7 | 20.0 | 19.6 |
| Residues having high boiling point | 0 | 0.15 | 0.22 | 1.8 | 3.22 | 3.90 |

EXAMPLE 3

The same m-xylene complex as in Example 1 was decomposed with evaporating and refluxing butane as a decomposing medium and the obtained results are shown in Table 3. That is, when a hydrocarbon having a low boiling point was employed, even if a pressure of up to about 8 atm. was applied, the occurrence of a side reaction was negligible.

TABLE 3

| Decomposition pressure atmospheres | 4 | 8 |
|---|---|---|
| Temperature of the column bottom, °C | 95 | 130 |
| Yield of recovered xylene (based on the supplied xylene, percent by weight) | 99.9 | 99.5 |

| | Composition of supplied xylene, percent by weight | Composition of recovered xylene, per cent by weight | |
|---|---|---|---|
| Benzene | 0 | 0 | 0.03 |
| Toluene | 0 | 0 | 0.01 |
| Ethyl benzene | 0.01 | 0 | 0 |
| p-Xylene | 0.21 | 0.25 | 0.27 |
| m-Xylene | 99.0 | 98.9 | 98.8 |
| o-Xylene | 0.79 | 0.84 | 0.85 |
| Residues having high boiling point | 0 | 0.01 | 0.04 |

EXAMPLE 4

In the process diagram as shown in the drawing, a temperature and a pressure of the extractor were −5° C.

and 3.5 atm. respectively. A modified fractionator was used for a decomposer and hexane was evaporated and refluxed as a decomposing medium. The operation was conducted under a pressure of 5.0 atm. at a column bottom temperature of 138° C. The hydrogen fluoride and the boron fluoride produced by the decomposition of complex were circulated to the extractor without using any circulating machine. Thus, an extremely stable operation could be achieved. Compositions of various streams in this case are shown in Table 4.

ture thereof that has a boiling point lower than that of the xylenes in the complex, the pressure in the decomposing step being higher than the pressure in the extracting step, and thereafter removing hydrogen fluoride and boron fluoride formed by the decomposition of the complex and recycling them at a pressure no greater than the pressure in the decomposing step to the extracting step for reuse as the extracting agent, and removing m-xylene or m-

TABLE 4

|  | Supplied material | Reflux | Raffinate | Extract | Stream taken out from the— | |
|---|---|---|---|---|---|---|
|  |  |  |  |  | Bottom of decomposer | Top of decomposer |
|  | 1 | 2 | 4 | 5 | 7 | 8 |
| Hydrogen fluoride |  |  | 5 | 458 |  | 453 |
| Boron fluoride |  |  | 0.5 | 52 |  | 51.8 |
| C₄-saturated hydrocarbon |  | 30 | 30 |  |  |  |
| Toluene | 2 |  | 2 |  |  |  |
| Ethyl benzene | 17 |  | 17 |  |  |  |
| p-Xylene | 20 | 0.1 | 19.9 | 0.2 | 0.33 |  |
| m-Xylene | 48 | 25 | 0 | 73.0 | 72.0 |  |
| o-Xylene | 13 | 0.2 | 12.8 | 0.4 | 0.15 |  |
| Residues having high boiling point |  |  |  |  | 0.25 |  |
| Total of hydrocarbon | 100 | 55.3 | 81.7 | 73.6 | 72.73 |  |

EXAMPLE 5

In the same process as in Example 4, an extracting temperature and a pressure of the extractor were −10° C. and 5 atm. respectively. A pressure of the decomposer was 6.5 atm. and a temperature of its bottom was 145° C. Under these conditions an operation was carried out. Hexane was used for a decomposing medium. Hydrogen fluoride and boron fluoride could be circulated to extractor in a stable state. Compositions of various streams in this case are shown in Table 5.

xylene and at least one of the other xylene isomers formed by the decomposition of the complex, whereby the isomerization and the disproportionation reaction of xylenes is restrained.

2. The process as claimed in claim 1, wherein the inert substance is carbon tetrachloride and/or at least one saturated hydrocarbon containing from 3 to 7 carbon atoms.

TABLE 5

|  | Supplied material | Reflux | Raffinate | Extract | Stream taken out from the— | |
|---|---|---|---|---|---|---|
|  |  |  |  |  | Bottom of decomposer | Top of decomposer |
|  | 1 | 2 | 4 | 5 | 7 | 8 |
| Hydrogen fluoride |  |  | 7 | 745 |  | 738 |
| Boron fluoride |  |  | 1 | 76 |  | 75.7 |
| Benzene |  |  | 1.5 |  |  |  |
| Toluene | 3 |  | 3 |  |  |  |
| Ethyl benzene | 33 | 0.05 | 32.0 | 0.2 | 0.1 |  |
| p-Xylene | 17 | 18 | 0.3 | 34.0 | 33.0 |  |
| m-Xylene | 36 | 38 | Trace | 74 | 74.2 |  |
| o-Xylene | 11 | 10.5 | Trace | 20.5 | 18.8 |  |
| Residues having high boiling point |  | 0.5 |  | 2.0 | 3.5 |  |
| Total of hydrocarbon | 100 | 67.05 | 36.8 | 130.7 | 129.6 |  |

We claim:

1. A process for recovering hydrogen fluoride and boron fluoride, said process comprising the steps of extracting a xylene mixture with an extracting agent comprising hydrogen fluoride and boron fluoride to form a xylene-hydrogen fluoride-boron fluoride complex, thereafter decomposing the complex by contacting it at a pressure of about 1 to about 8 atmospheres and a temperature of about 40° C. to about 200° C. with an inert substance under reflux, the inert substance being a saturated hydrocarbon or a saturated halogenated hydrocarbon or mix-

References Cited

UNITED STATES PATENTS

| 2,440,543 | 4/1948 | Hughes | 23—153 |
| 2,521,444 | 9/1950 | Brooke et al. | 260—674 |
| 2,868,854 | 1/1959 | Lien et al. | 260—668 |
| 3,111,546 | 11/1963 | Hemminger | 260—668 |

EDWARD STERN, Primary Examiner

U.S. Cl. X.R.

23—205; 260—668, 674